Figure 1:
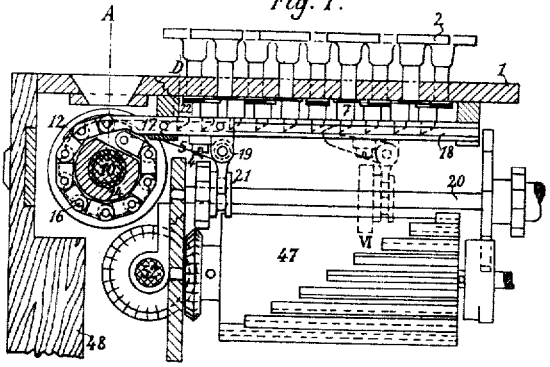

H. DAEMEN-SCHMID.
CALCULATING MACHINE.
APPLICATION FILED SEPT. 3, 1909.

1,015,842.

Patented Jan. 30, 1912.
4 SHEETS—SHEET 1.

Witnesses:

Inventor:
Heinrich Daemen-Schmid
by B. Singer, Atty.

H. DAEMEN-SCHMID.
CALCULATING MACHINE.
APPLICATION FILED SEPT. 3, 1909.
1,015,842.
Patented Jan. 30, 1912.
4 SHEETS—SHEET 2.
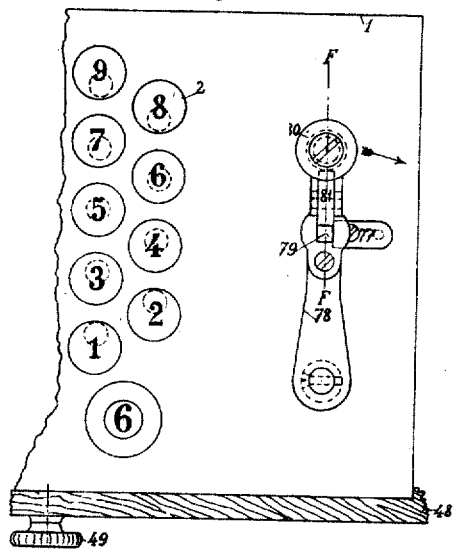
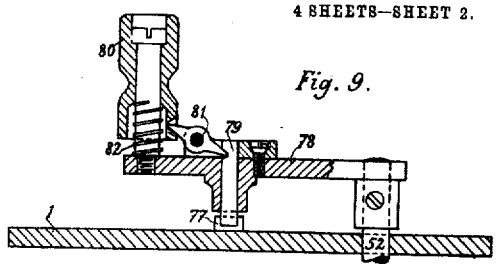
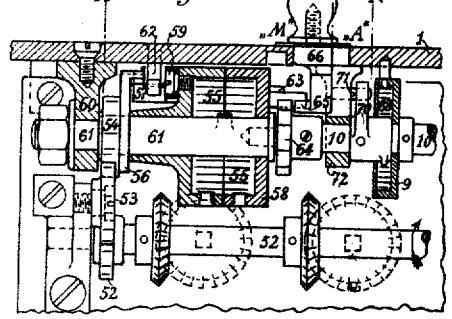
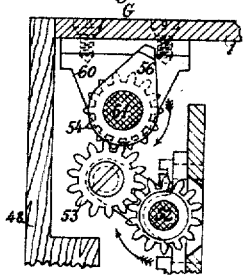
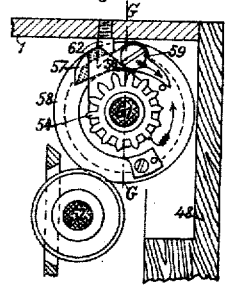
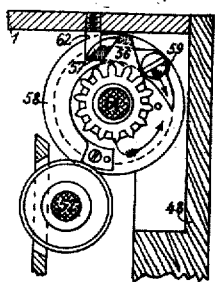
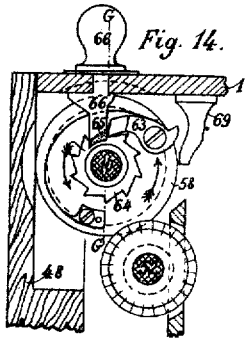
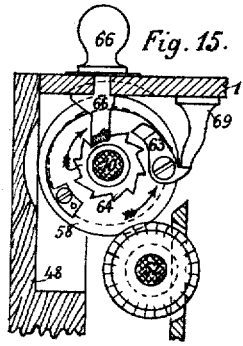
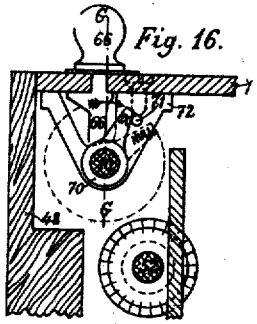
Witnesses:
Inventor:
Heinrich Daemen-Schmid,
by B. Singer,
Atty.

H. DAEMEN-SCHMID.
CALCULATING MACHINE.
APPLICATION FILED SEPT. 3, 1909.

1,015,842.

Patented Jan. 30, 1912.

4 SHEETS—SHEET 3.

Witnesses:

Inventor:
Heinrich Daemen-Schmid
by C. Linger
Atty.

H. DAEMEN-SCHMID.
CALCULATING MACHINE.
APPLICATION FILED SEPT. 3, 1909.

1,015,842.

Patented Jan. 30, 1912.

4 SHEETS—SHEET 4.

Witnesses:

Inventor:
Heinrich Daemen-Schmid
by D. Singer,
Att'y

UNITED STATES PATENT OFFICE.

HEINRICH DAEMEN-SCHMID, OF ZURICH, SWITZERLAND.

CALCULATING-MACHINE.

1,015,842.

Specification of Letters Patent.

Patented Jan. 30, 1912.

Application filed September 3, 1909. Serial No. 516,072.

*To all whom it may concern:*

Be it known that I, HEINRICH DAEMEN-SCHMID, a subject of the German Emperor, and resident of 178 Zurichstrasse, Zurich, Switzerland, have invented new and useful Improvements in Calculating-Machines.

This invention relates to calculating machines, especially to those machines which are known under the name of "Thomas-machines," and to other similar machines.

In machines of this kind the key-board usually was provided with a plurality of straight slots and the figures from "0" to "9" were printed alongside these slots.

For the purpose of performing an operation with one of the figures a knob extending through the slot must be moved within the slot until an indicator fastened to the knob is in opposition to the respective figure. By this adjustment of the knob a switch wheel is displaced which coacts with a switch cylinder or with a similar device provided with a plurality of teeth of various lengths. This operation has various disadvantages. It takes a comparatively long time to move the knob from the "0" position to the position of the higher figures, for instance, "8" and "9." For operating with a figure containing a plurality of digits the line of the knobs presents a broken irregular appearance, which disturbs safe and quick control of the operation.

An object of this invention is to provide adjusting means which are moved to the same extent, without any regard to the value of the digit.

Another object of the invention is to displace the switch wheel automatically to the desired point without varying the movement of the displacing key.

Another object of the invention is to lock the displacing means safely in a zero position as long as no adjusting key is actuated.

A further feature of novelty of this invention is to lock the switch wheel in the adjusted position after the key is released.

A further object of the invention is to provide means for returning an adjusted switch wheel to a position between "0" and that position to which it was adjusted.

A still further object of the invention is to provide means for returning either one or all of the adjusted switch wheels to a zero position.

A still further object of the invention is to return simultaneously all of the switch wheels to a zero position by one full rotation of a crank and to provide means for stopping said crank after completion of one revolution.

Other objects of the invention will be more fully described in connection with the accompanying drawings and will be more clearly pointed out and ascertained in and by the appended claims.

Figure 6:
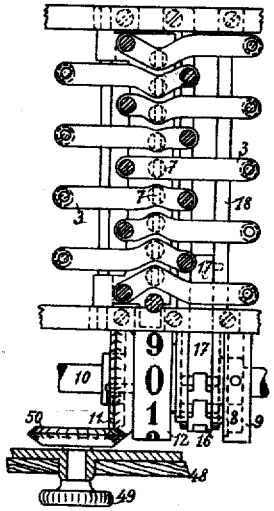
Figure 2:
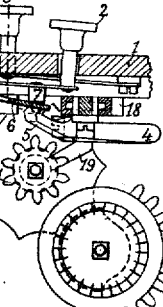
Figure 3:
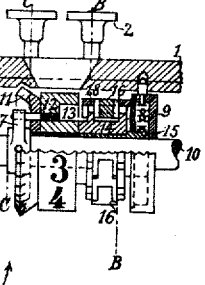
Figure 4:
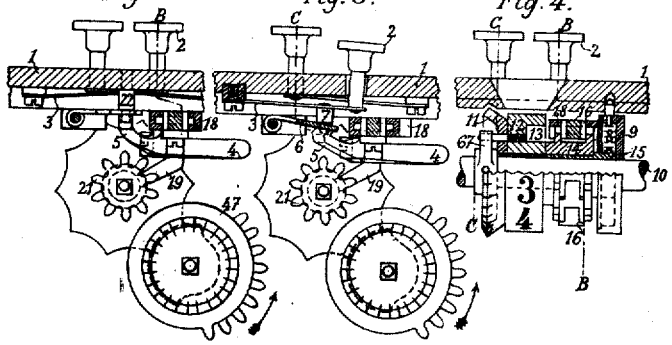
Figure 5:
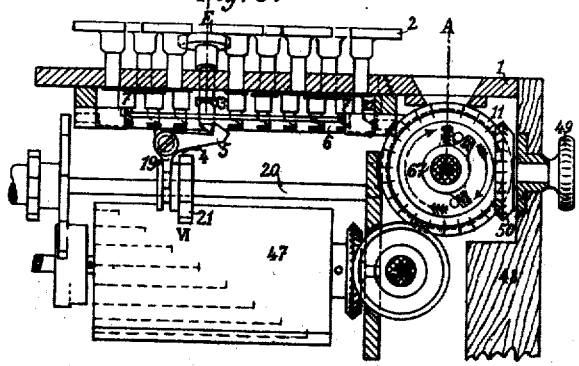
Figure 7:
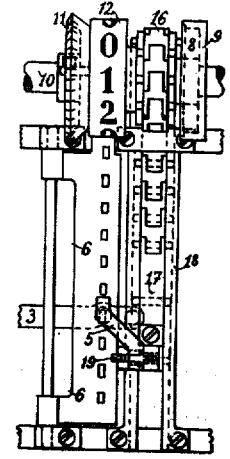
Figure 17:
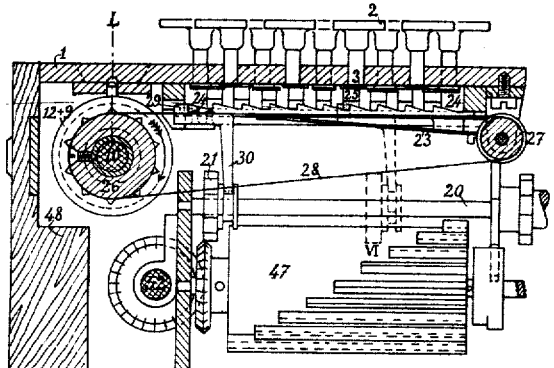
Figure 18:
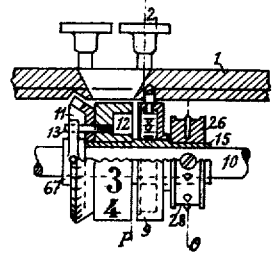
Figure 19:
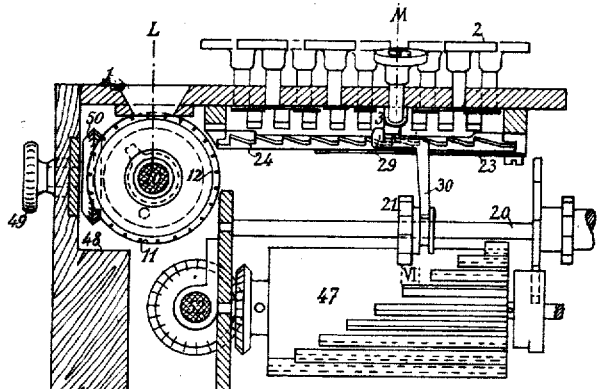
Figure 20:
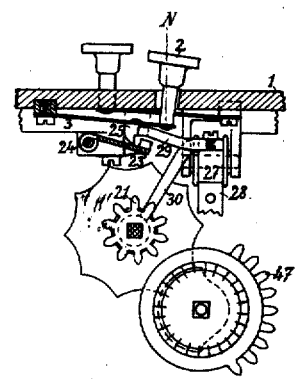
Figures 21, 22:
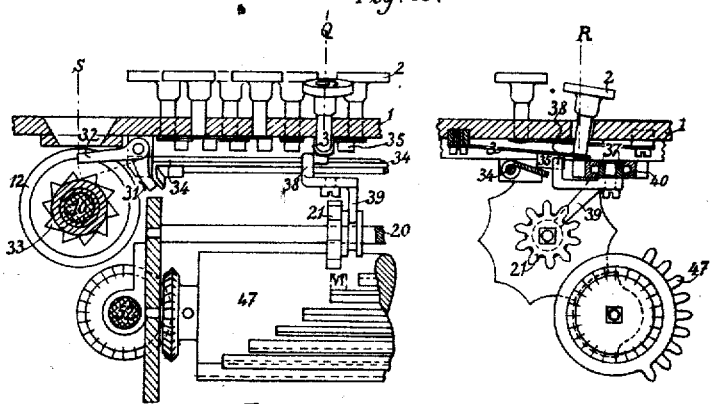
Figure 23:
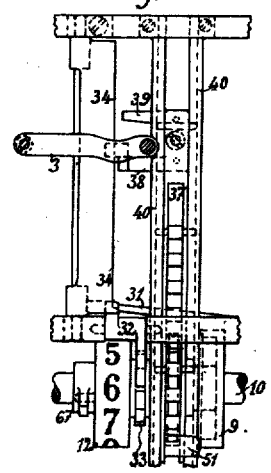
Figures 24, 25:
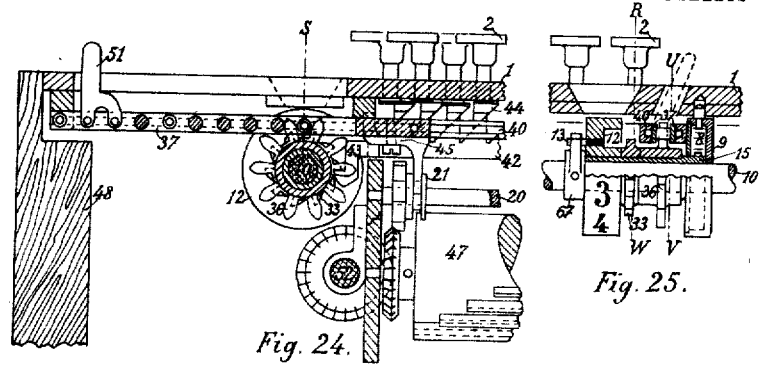
Figures 26, 27:
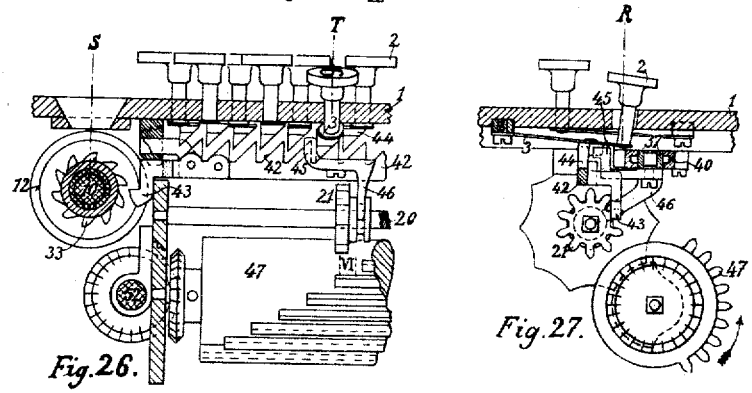
Figures 28, 29, 30, 31:
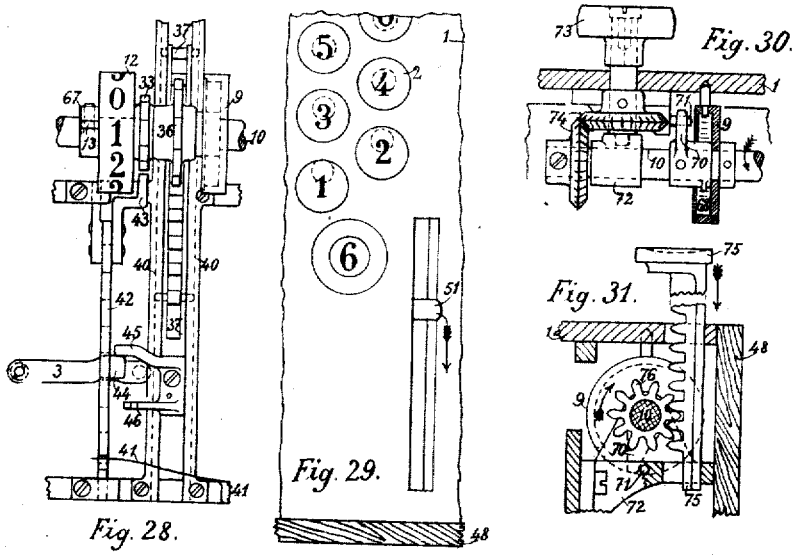

In the drawings:—Figure 1 is a vertical sectional view through a portion of a calculating machine taken on line B of Fig. 2, several parts being shown in elevation seen from one side of the actuating means. Fig. 2 is a sectional view on line D of Fig. 1 showing the actuating means at rest. Fig. 3 is a sectional view similar to Fig. 2 taken on line E of Fig. 5 and showing the actuating means in an operative position. Fig. 4 is a sectional view and partly an elevation on line A of Fig. 1. Fig. 5 is a sectional view similar to Fig. 1, taken on line C of Fig. 3, and seen from the other side of the actuating means. Fig. 6 is a top plan view of the springs connected with the actuating keys, the top plate being removed. Fig. 7 is a bottom plan view similar to Fig. 6. Fig. 8 is a top plan view of part of the top plate of the machine. Fig. 9 is a sectional view through the operating crank, taken on line F—F of Fig. 8. Fig. 10 is a longitudinal sectional view through the return mechanism on line G—G of Fig. 12. Fig. 11 is a sectional view on line H of Fig. 10, showing the drive for the return mechanism. Fig. 12 is a sectional view showing the return mechanism in operative position. Fig. 13 is a similar sectional view showing the return mechanism in a release position. Fig. 14 is a sectional view on line J of Fig. 10 showing the unwinding mechanism in an operative position. Fig. 15 is a similar view showing the same mechanism in a release position. Fig. 16 is a sectional view of the same mechanism taken on line K of Fig. 10. Fig. 17 is a longitudinal sectional view similar to Fig. 1 showing a modification of the displacing means for the switch wheel, the section being taken on line N—O of Fig. 18. Fig. 18 is a sectional view of the same modification on line L of Fig. 17. Fig. 19 is a sectional view similar to Fig. 17 taken on the line N—P of Fig. 18, actuating means being shown in operative position. Fig. 20 is a sectional view through the same modification taken on line M of Fig. 19. Fig. 21 is a sectional view similar to Fig. 1, showing a third modification of the displacing means for the switch wheel, actuating means being shown in operative position. Fig. 22 is a section through the same modification taken on line Q of Fig. 21. Fig. 23 is a bottom plan view of said modification. Fig. 24 is a sectional view similar to Fig. 21 showing another portion of the switch displacing means, taken on line U—U of Fig. 25. Fig. 25 is a sectional view taken on line S of Fig. 24. Fig. 26 is a sectional view similar to Fig. 1 showing another modification of the switch wheel displacing means, the actuating means being shown in operative position. Fig. 27 is a sectional view of the same on line T of Fig. 26. Fig. 28 is a bottom plan view of the switch wheel displacing means of the last mentioned modification. Fig. 29 is a top plan view of the top plate of the machine showing a means for returning an individual switch wheel to a zero position. Fig. 30 is a sectional view of a modification of the returning means. Fig. 31 is a similar sectional view showing another modification of the returning means.

Like numerals of reference designate similar parts throughout the different figures of the drawings.

A plurality of actuating keys 2 projecting beyond the top plate 1 of the machine are provided with springs 3 at their lower end. For the purpose of saving space the keys are arranged in two rows and staggered with respect to each other. Each of the springs 3 carries on its bottom side a pin 7 provided with a preferably rectangular tooth by means of which they extend through a tipping bar 6. A spring 4 fastened below the tipping bar 6 serves for pressing a hook 5 upwardly into engagement with the tipping bar 6. The bar 6 is pivotally mounted as may be clearly seen by reference to Figs. 2 and 3. A shaft 10 preferably disposed at right angle to the row of keys carries a casing 9 which is held stationary with respect to the top plate 1. A spring 8 wound about said shaft and fastened to the casing at one end exerts a turning effect upon a sleeve 15, on said shaft. The shaft 10 also carries a bevel gear 11 and a number wheel 12, both of said wheels being mounted on the sleeve 15 loosely surrounding said shaft. The number wheel is provided on its circumference with the figures from zero (0) to nine (9) and carries a pin 13 which projects laterally through the bevel gear 11. A sprocket wheel 14 is mounted on the sleeve 15 between the casing and the number wheel. A chain 16 consisting of nine short links and one long link 17 is fastened to the sprocket wheel 14. The links of the chain are interconnected by means of pins which extend laterally on both sides of the chain and which are guided in channels 18 near the bottom face of the top plate. A preferably square shaft 20 disposed parallel to the row of keys carries a switch wheel 21 which is provided with a circumferential groove. The switch wheel 21 is slidably mounted on the shaft 20 and rotates with the same. A bell crank lever 19 pivotally mounted on link 17 enters with one arm into the circumferential groove of the switch wheel 21 and the other arm is connected or provided with a hook 5. The spring 8 within the casing 9 is tensioned to rotate the sleeve 15 so that the chain 16 is wound up entirely on the sprocket and so that the end link 17 is pulled back tangentially, holding the lever 19 and the switch wheel 21 in a zero position. In this position the hook 5 is locked by engagement with a pin 22 projecting downwardly from the top plate 1.

If any of the keys 2 is depressed the pin 7 fastened to the spring 3 of the respective key, will move the bar 6 downwardly about its pivotal points of suspension. With the depression of the bar 6 hook 5 is released from its engagement with the locking pin 22. By this means the spring 8 is released and the sprocket wheel 14 rotates, moving thereby the chain 16 rapidly between the guiding channels 18. If it is assumed that the key "6" is the actuated key the hook 5 will abut against the pin 7 of this key and the further movement of the chain will be stopped. The switch wheel 21 is displaced on the shaft 20, simultaneously with the movement of the first link 17, until it reaches the desired position indicated by VI in Fig. 1.

When the operator removes his hand from the actuating key the spring 3 raises said key into starting position and the hook 5 follows said spring 3 under the action of the spring 4 connected with the lever 19 and is locked in engagement with the last actuated key. By this means the switch wheel 21 is also locked in the desired position. In the rotation of the sprocket 14 the number wheel 12 is rotated to the same degree so that said number wheel displays the numeral "6" through the inspecting aperture provided in the top plate of the machine.

In the modification shown in Figs. 17, 18, 19 and 20 a pulley 26 is provided on the sleeve 15 of the shaft 10 and a smaller pulley 27 is secured to the top plate 1 by means of suspension bearings. Each of the springs 3 fastened to the actuating keys carries a downwardly projecting recessed shoulder 25, while a tipping bar 24 is provided with a plurality of teeth. An endless belt 28 is in engagement with pulleys 13

26 and 27, and slipping of said belt may be prevented by means of a plurality of pins projecting radially from the pulley 26. An arm 29 is fastened to the belt 28, said arm being rigidly connected to a depending member 30 which enters the circumferential groove of the switch wheel 21. The tipping bar 24 is pressed upwardly by means of a spring 23 fastened to the top plate.

When the key "6" is depressed the tooth 25 attached to the spring of said key swings the toothed tipping bar 24 downwardly and releases thereby the arm 29 which was held in a zero position by engaging with the first upwardly projecting tooth of the bar. The spring 8 rotates the sleeve 15 as soon as the arm 29 is out of engagement with said projection and the belt 28 is displaced until the arm 29 engages the respective depressed tooth of the shoulder 25. Upon release of the actuating key the bar 24 will be pressed upwardly by spring 23. The belt 28 will then be moved until hook arm 29 engages the next projection of bar 24, which will finally place the switch wheel in the desired position. The switch wheel is locked in this position VI by the engagement of the arm 29 with the next projection of the tipping bar 24.

In the modification shown in Figs. 21 to 25, a ratchet wheel 33 is mounted on the sleeve of shaft 10 and a spring 31 serves for pressing one arm of a bell crank lever 32 against the sloping shoulder of a pivotal tipping bar 34. Each of the springs 3 carries a downwardly projecting shoulder 35 which is adapted to be engaged by the upwardly projecting finger 38 fastened to a cog-bar 37. A depending arm 39 preferably in integral connection with the finger 38 serves for displacing the switch wheel 21 on its shaft. The cog-bar 37 is provided with laterally projecting pins which serve for guiding the same within the channels 40. Upon depression of an actuating key 2 the shoulder 35 of the same will tilt the bar 34 downwardly until the sloping surface at one end thereof swings the free arm of the lever 32 out of engagement with the ratchet wheel 33, releasing thereby the displacing means from zero position. A cog-gear 36 mounted on the loose sleeve on the shaft 10 will be rotated by action of the spring 8 and will therefore displace the cog-bar 37. Upon release of the actuating key the shoulder 35 is withdrawn from engagement with the finger 38 and the bar 34 is pressed upwardly by means of the spring 31 engaging the lever 32. This movement releases the finger 38 and said finger with the switch wheel 21 is finally moved into the desired position VI by the cog rod 37 while the lever 32 locks the ratchet wheel 33 against turning.

In the modification shown in Figs. 26 to 28 each of the springs 3 is provided with a downwardly depending shoulder 44. A flat spring 41 presses against the end of a bar 42 which is provided with upwardly projecting portions resembling the teeth of a saw. This bar is adapted to slide somewhat in both directions. A hook 43 fastened to the other end of the bar 42 projects between the teeth of the ratchet gear 33 holding the device in zero position as long as said gear is at rest. A hook arm 45 is permanently fastened to the cog-bar 37 projecting with its rear end 46 into the circumferential groove of the switch wheel 21. When the actuating key is depressed the shoulder 44 fastened on the spring 3 will slidingly enter between two teeth of the bar 42 and displace the same to a slight extent so that the hook 42 is released from engagement with the ratchet wheel 33. The sleeve on shaft 10 following the action of the spring 8 rotates and pushes the cog-bar 37 some suitable means forwardly until the arm 45 abuts against the shoulder 44 of the depressed key. The arm 45 is then slightly in front of the position which the same will occupy finally. Upon release of the actuating key the bar 42 is moved backward under action of spring 41, so that the hook 43 enters between the teeth of the ratchet wheel 33. The cog-rod 37 is moved forwardly until this engagement of hook 43 and ratchet 33 is complete by placing thereby, the arm 45 and the switch wheel 21 into final position. The switch wheel 21 is locked in this position by the hook 43 in engagement with the ratchet wheel 33.

By reference to Fig. 6 it will be seen that the springs 3 are provided with more or less curved portions so that the keys on top of the machine may be spaced to an extent which facilitates operation of the machine, and the exactness of the manufacture of those parts of the displacing means which enter into mutual engagement. The return movement of each of the displacing means may be actuated by hand or they may be returned to zero position by automatic means provided in the machine. The return movement is obtained by winding the driving gear in opposite direction to that caused by the spring 8. The displacing means preferably are brought back somewhat beyond zero position and spring 8 immediately upon release will cause their advance movement till the zero locking means are engaged. A bevel gear 50 meshes with the gear 11 mounted on the shaft 10 and a shaft extending through the wall of the casing carries an actuating knob 49. The bevel gear 11, number wheel 12 and spring 8 may be rotated under coaction of the knob 49 so that the displacing means are moved back into a zero position in which they may be locked by the pin 22, or in some other way respectively.

By reference to Figs. 24 and 29, it will be noted that a lever 51 projecting from the cog-rod 37, through a slat in the top plate may serve as a means for returning each cog-rod individually into a zero position.

In Figs. 10 to 16 inclusive, the mechanism is shown for simultaneously returning all of the displaced switch wheels to a zero position. The machine is operated by means of a crank which actuates a transmission gear 52. The movement of this gear is transmitted to the intermediate gearing 53 and 54. The gear wheel 54 is loosely mounted on the shaft 61 which is rigidly secured in the machine and the gear 54 carries a rotating arm 56 provided with a projecting shoulder. A casing 58 containing a strong spiral spring 55 is fastened with one end to the shaft 61 and with the other end to the casing and is rotated by the engagement of the shoulder of the arm 56 with the projection 57 of a pawl 59 attached to the casing. By this means the spring 55 is wound up in the direction of the arrow shown in Figs. 12 and 13; shaft 61 is secured in the depending support 60 in the casing. After the arm 56 has completed nine-tenths ($\frac{9}{10}$) of a revolution an inclined surface of the pawl 59 is brought into engagement with a pin 62 fastened on the lower side of the top plate 1 and also provided with a sloping surface. The pawl 59 will be pushed inwardly in direction toward the casing 58 and the projection 57 will be disengaged from arm 56. In this way the casing is released and the spring 55 will rotate the same backwardly to the same extent in which it has been rotated in the opposite direction. In the return movement of the casing the projection 57 will strike again against the shoulder of the arm 56 and will be locked in this position. A pawl 63 is pivotally mounted on the opposite side of the casing 58, said pawl sliding over the teeth of a ratchet wheel 64 while the casing is rotating in the direction in which the spring is wound up. In this movement the pawl 63 will also slide over the shoulder 65 of an adjuster 66 when the same is shifted in the respective position. During the release of the spring 55, however, the pawl 63 will rotate the ratchet wheel 64 which is mounted on the shaft 10. But if an adjuster 66 is moved in the position indicated by "M" in Fig. 10, the pawl will strike against the shoulder of said adjuster and the ratchet wheel cannot be rotated. This is the position into which the adjuster is shifted when a multiplication is to be performed. After the termination of the multiplication the adjuster is withdrawn into the position indicated by "A" and the pawl 63 will release the ratchet wheel 64 so that the same may be rotated and by this means the shaft 10 and all of the displacing means are moved in zero position.

A spiral spring 68 is wound up during the backward rotation of the shaft 10. An arm 67 engaging pin 13 of the number wheel rotates each bevel gear and number wheel backwardly to zero position; the pawl 63 causes winding up of the spring 68. Near the end of the movement of spring casing 55 pawl 63 strikes against stop 69, releasing thereby the ratchet wheel 64. Toward the end of movement of shaft 10 arm 70 strikes against pin 71 of support 72. The shaft 10 may also be rotated to return the displacing means to a zero position by means of a special knob or crank 73 provided with a bevel gearing 74. In Fig. 31 a rack bar 75 is shown in engagement with a ratchet wheel 76 and by depressing said bar the return rotation of the shaft 10 may be obtained. In each of these returning means finger 70 strikes against a fixed pin 71 slightly beyond the zero position. When the knob 73 is released the shaft 10 with the part 67, will be returned into the position indicated by IX.

For the purpose of preventing an excess movement of actuating crank of the machine a stop 77 is fastened to the plate 1 and a pin 79, vertically displaceable within the crank arm 78, is adapted to strike against said stop. The handle 80 of the crank is pressed upwardly by means of a spring 82 and a double arm lever 81 pivotally mounted on the crank arm 78 may be depressed against the action of said spring raising thereby the pin 79 from engagement with said stop.

I claim:—

1. In a device of the class described the combination of a shaft, a switch wheel displaceably mounted on said shaft, a rotating member, and means connecting said member and said switch wheel for displacing said switch wheel, said means moving tangentially with respect to said rotating member.

2. In a device of the class described the combination of a shaft, a switch wheel slidably mounted on said shaft, a gear, means connecting said gear and said switch wheel for displacing said switch wheel on said shaft, and means coacting with said gear for returning said switch wheel into starting position on said shaft.

3. In a device of the class described the combination of a shaft, a switch wheel slidably mounted on said shaft, a resiliently actuated gear, means connecting said gear and said switch wheel for displacing said switch wheel on said shaft and means coacting with said gear for returning said switch wheel into starting position on said shaft.

4. In a device of the class described the combination of a switch wheel, a shaft, said switch wheel being slidably mounted on said shaft, a gear, a spring holding said gear against rotation, means in connection with said gear for displacing said switch wheel on said shaft, means for releasing said spring and means for returning said switch wheel into a starting position, said last named means putting said spring under tension.

5. In a device of the class described the combination of a switch wheel, a shaft, said switch wheel being slidably mounted on said shaft, a gear, a spiral spring holding said gear against rotation, means in connection with said gear for adjusting said switch wheel on said shaft, means for releasing said spring and means for returning said switch wheel into starting position, said last named means serving simultaneously for rewinding said spring.

6. In a device of the class described the combination of a switch wheel, a shaft, said switch wheel being slidably mounted on said shaft, a second shaft, a gear mounted thereon, a spiral spring mounted on said second shaft, and holding said gear against rotation, means connecting said gear and said switch wheel for displacing the same on said first named shaft, means for releasing said spring to rotate said gear in one direction, and means for returning said switch wheel into starting position, said last named means actuating said gear in the opposite direction and serving simultaneously for rewinding said spring.

7. In a device of the class described the combination of a shaft, a switch wheel slidably mounted on said shaft, a resiliently actuated gear, means connecting said gear and said switch wheel for displacing said switch wheel on said shaft, means for coacting with said gear for returning said switch wheel into starting position, in said shaft, and an element for locking said connecting means in starting position.

8. In a device of the class described the combination of a shaft, a switch wheel slidably mounted on said shaft, a gear, means connecting said gear and said switch wheel for displacing said switch wheel on said shaft, means coacting with said gear for returning said switch wheel into starting position, an element for locking said connecting means in starting position, and means for releasing said connecting means from said locking element.

9. In a device of the class described the combination of a shaft, a switch wheel slidably mounted on said shaft, a plurality of actuating keys, a resiliently actuated gear, means connecting said switch wheel and said gear for displacing said switch wheel on said shaft, an element in coaction with said keys for limiting the movement of said switch wheel, and means for returning said switch wheel into starting position.

10. In a device of the class described the combination of a plurality of shafts, switch wheels, each switch wheel being slidably mounted on one of said shafts, a gear, a spring holding said gear against rotation, a displacing member connecting said gear and said switch wheels, means for releasing said spring to rotate said gear in one direction and to displace said switch wheels, and separate means for each of said switch wheels to displace the same in the opposite direction.

11. In a device of the class described the combination of a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said switch wheels for displacing said switch wheels on said first named shafts, and separate means coacting with each of said second named shafts for displacing said switch wheels in opposite direction and for winding said springs.

12. In a device of the class described the combination of a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said switch wheels for displacing said switch wheels on said first named shafts and means for displacing said switch wheels in opposite directions simultaneously and for rewinding said springs.

13. In a device of the class described the combination, of a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said switch wheels for displacing said switch wheels on said second named shafts and means coacting with each of said second named shafts for automatically displacing said switch wheels in opposite directions and for rewinding said springs.

14. In a device of the class described the combination, of a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said switch wheels for displacing said switch wheels on said first named shafts, means for automatically returning all of said switch means into starting positions and an element locking said last named means while said switch wheels are displaced in one direction.

15. In a device of the class described the combination of a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said switch wheels for displacing said switch wheels on said first named shafts, means coacting with each of said second named shafts for returning all of said switch wheels simultaneously in the starting position, and an adjuster adapted to lock said returning means for the operations of multiplication and division and for releasing the same in the operation of addition and subtraction.

16. A device of the class described comprising in combination, a plurality of shafts, switch wheels, each switch wheel being slidably mounted on one of said shafts, a plurality of second shafts, gears rotatably mounted on said second shafts, spiral springs for holding said gears against rotation, means for releasing said springs to rotate said gears in one direction, means connecting said gears and said first named shafts, a plurality of bevel gears in coaction with said second gears and a crank actuating said bevel gears for simultaneously returning all of said switch wheels in the starting position.

17. In a device of the class described the combination of a switch wheel, a shaft, said switch wheel being slidably mounted on said shaft, a gear, a spring holding said gear against rotation, means in connection with said gear for displacing said switch wheel on said shaft, means for releasing said spring, a crank for returning said switch wheel into starting position by one revolution and means for stopping said crank after one revolution.

18. In a device of the class described the combination of a switch wheel, a shaft, said switch wheel being slidably mounted on said shaft, a second shaft, a gear mounted thereon, a spiral spring mounted on said second shaft and holding said gearing against rotation, means connecting said gear and said switch wheel for displacing the same on said first named shaft, means for releasing said spring to rotate said gear in one direction, and an indicating wheel mounted on said second shaft and rotatable with said gears.

19. In a device of the class described the combination of a shaft, a switch wheel slidably mounted on said shaft, a sprocket mounted on said shaft, a chain connecting said sprocket and said switch wheel, means for winding said chain off said sprocket, and means coacting with said sprocket for returning said switch wheel into starting position on said shaft.

20. In a device of the class described, the combination of a shaft, a switch wheel slidably mounted on said shaft, a pair of pulleys, a conveying belt guided over said pulleys and connected to said switch wheel, means for driving said belt and displacing said switch wheel, and means for returning the same into a starting position.

21. In a device of the class described, the combination of a shaft, a switch wheel slidably mounted on said shaft, a second shaft, a cog-wheel mounted on said second shaft, a cog-bar in engagement with said cog-wheel and connected with said switch wheel, means for rotating said cog-wheel, and means for returning said switch wheel into starting position.

22. In a device of the class described, the combination of a shaft, a switch wheel slidably mounted on said shaft, a second shaft, a ratchet gear mounted on said second shaft, a rack-bar slidably mounted with respect to said gear, means for locking said rack-bar with respect to said ratchet, and means for returning said switch wheel into starting position.

23. In a device of the class described, the combination of a shaft, a switch wheel slidably mounted on said shaft, a second shaft, a gear mounted on said second shaft, means connected with said gear for displacing said switch wheel on said first named shaft, means for returning said switch wheel to a starting position, and an element for guiding said displacing means.

24. In a device of the class described, the combination of a shaft, a switch wheel slidably mounted on said shaft, a second shaft, a gear on said second shaft, means connected with said gear for displacing said switch wheel on said first named shaft, and a lever projecting from said means for returning said switch wheel to a starting position.

In testimony whereof I affix my signature in presence of two witnesses.

HEINRICH DAEMEN-SCHMID.

Witnesses:
 CARL GUBLER,
 JOHANN BENZ.